(12) United States Patent
Kang et al.

(10) Patent No.: US 8,402,132 B2
(45) Date of Patent: Mar. 19, 2013

(54) METHOD, SYSTEM AND DEVICE FOR DEVICE CAPABILITIES EXCHANGE

(75) Inventors: Jiao Kang, Shenzhen (CN); Mingjun Shan, Shenzhen (CN); Chun Li, Shenzhen (CN); Xin Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

(21) Appl. No.: 12/945,991

(22) Filed: Nov. 15, 2010

(65) Prior Publication Data

US 2011/0060830 A1    Mar. 10, 2011

Related U.S. Application Data

(63) Continuation of application No. PCT/CN2008/072973, filed on Nov. 6, 2008.

(30) Foreign Application Priority Data

May 13, 2008  (CN) .......................... 2008 1 0094554

(51) Int. Cl.
*G06F 15/16* (2006.01)
*G06F 15/173* (2006.01)

(52) U.S. Cl. ........ 709/224; 709/206; 709/223; 709/238; 709/204; 709/244; 726/13; 370/401; 370/392; 370/328; 370/248; 370/241

(58) Field of Classification Search .................. 709/224, 709/238, 229, 205, 223, 204, 244
See application file for complete search history.

(56) References Cited

U.S. PATENT DOCUMENTS

| | | | |
|---|---|---|---|
| 2006/0223503 A1 | 10/2006 | Muhonen et al. | |
| 2007/0288543 A1 | 12/2007 | Evans et al. | |
| 2009/0144434 A1 | 6/2009 | Tian et al. | |
| 2011/0035413 A1* | 2/2011 | Bessis et al. | 707/799 |

FOREIGN PATENT DOCUMENTS

| | | |
|---|---|---|
| CN | 1233897 | 11/1999 |
| CN | 101047707 | 10/2007 |
| CN | 101047707 A | 10/2007 |
| EP | 0954147 | 11/1999 |
| EP | 1376989 | 1/2004 |
| EP | 1750469 A1 | 2/2007 |
| KR | 10-2005-0063608 | 6/2005 |
| WO | 2006/106388 | 10/2006 |

OTHER PUBLICATIONS

Written Opinion of the International Searching Authority mailed Feb. 26, 2009 issued in corresponding International Patent Application No. PCT/CN2008/072973.
European Search Report dated Jan. 31, 2012 issued in corresponding European Patent Application No. 08874247.3.
P. Calhoun et al., "Diameter Base Protocol", The Internet Society Network Working Group, Sep. 2003, pp. 1-147.
International Search Report, mailed Feb. 26, 2009, in corresponding International Application No. PCT/CN2008/072973.
Office Action issued Sep. 21, 2012 in corresponding Chinese Patent Application No. 200880128701.6 (14 pages) (2 pages English translation).

* cited by examiner

*Primary Examiner* — Jude Jean Gilles
(74) *Attorney, Agent, or Firm* — Staas & Halsey LLP

(57) ABSTRACT

A method, system and device for device capabilities exchange are provided. The method for device capabilities exchange includes: receiving a device capability exchange request sent from an initiating Diameter node; and returning a device capability exchange answer to the initiating Diameter node according to a state of a state machine of a receiving Diameter node or a request type in the device capability exchange request. The method can optimize the existing method for updating and negotiating device capability information when a Diameter device is upgraded, reduce the amount of data exchanged over the network, reduce the repetition of database update performed by the Diameter nodes, and improve the robustness of network connection and system processing.

18 Claims, 12 Drawing Sheets

METHOD, SYSTEM AND DEVICE FOR DEVICE CAPABILITIES EXCHANGE

CROSS-REFERENCE TO RELATED APPLICATIONS

This application is a continuation of International Application No. PCT/CN2008/072973, filed on Nov. 6, 2008, which claims priority to Chinese Patent Application No. 200810094554.7, filed on May 13, 2008, both of which are hereby incorporated by reference in their entireties.

FIELD OF THE TECHNOLOGY

The present invention relates to the field of network communication technology, and more particularly to a method, system and device for device capabilities exchange.

BACKGROUND OF THE INVENTION

Since the inception of networks, the authentication, authorization and accounting (AAA) system has been the foundation of network operation. The use of all kinds of network resources needs to be managed by AAA. As existing AAA protocols, Diameter protocol and its extensions propose a complete set of AAA solutions, including a device capability exchange solution when connections are established between Diameter nodes, a message routing solution, a Network Access Server Requirements (NASREQ) solution, a mobile Internet Protocol (IP) solution, and the like.

A Diameter-based AAA system mainly includes a Diameter server, a Diameter client, a Diameter relay, a Diameter proxy, and a Diameter redirector, which are collectively referred to as Diameter nodes.

In the prior art, after a Diameter connection is established, device capability exchange is realized by a device capability exchange solution for the initial phase. Once device capabilities of a Diameter node are changed after the connection is established, the Diameter node notifies all Diameter nodes connected thereto of latest device capability information, and after receiving the notification, the Diameter nodes return latest device capability information to the initiating node. Therefore, in the prior art, if capabilities of a Diameter node are changed, a device capability exchange command needs to be sent, so as to ensure that other Diameter nodes connected to the Diameter node can be notified of the device capability update information in time.

During the implementation of the present invention, the inventor found that the prior art at least has the following problems.

When device capability information of two Diameter nodes is changed, device capability information of the two Diameter nodes carried in the device capability exchange command is the same, and the two Diameter nodes respectively update the device capability information of the counterpart in their databases twice, resulting in that the Diameter nodes repeatedly update the Diameter device capability information, In addition, when device capability information of one Diameter node is changed, the Diameter node needs to notify latest device capability information, and the receiver needs to return its own device capability information. If device capability information of the receiver is not changed, the processing increases the amount of data exchanged over the network, and after receiving the device capability information of the receiver returned by the receiver, the Diameter node also need to update the database once. In this case, when Diameter devices perform a capability exchange, a large amount of data is involved, thereby increasing the redundancy of system processing. For the Diameter base protocol, complex redundant operations will cause decreases in the robustness and stability of network connection and system processing.

SUMMARY OF THE INVENTION

Accordingly, the present invention is directed to a method, system and device for device capabilities exchange, so as to optimize the operation of updating the Diameter device capability information, reduce the amount of data involved when Diameter devices perform a capability exchange, and improve the robustness and stability of system processing.

In order to achieve the above objectives, in one aspect, the present invention provides a method for device capabilities exchange, which includes the following steps.

A device capability exchange request sent from an initiating Diameter node is received.

A device capability exchange answer is returned to the initiating Diameter node according to a state of a state machine of a receiving Diameter node or a request type in the device capability exchange request.

In another aspect, the present invention further provides a system for device capabilities exchange, which includes an initiating Diameter node and a receiving Diameter node.

The initiating Diameter node is adapted to send a device capability exchange request.

The receiving Diameter node is adapted to return a device capability exchange answer to the initiating Diameter node according to a state of a state machine of the receiving Diameter node or a request type in the device capability exchange request, so as to enable the initiating Diameter node to update a device capability information database of the initiating Diameter node.

In still another aspect, the present invention further provides a receiving Diameter node, which includes a receiving module and an answer sending module.

The receiving module is adapted to receive a device capability exchange request sent from an initiating Diameter node, in which the device capability exchange request carries device capability information.

The answer sending module is adapted to return a device capability exchange answer to the initiating Diameter node according to a state of a state machine of the receiving Diameter node or a request type in the device capability exchange request received by the receiving module.

Compared with the prior art, the present invention has the following advantages. Through the embodiments of the present invention, the receiving Diameter node receives the device capability exchange request sent from the initiating Diameter node, and returns the device capability exchange answer to the initiating Diameter node according to the state of the state machine of the receiving Diameter node or the request type in the device capability exchange request. Thus, the existing method for updating and negotiating device capability information when a Diameter device is upgraded is optimized, the validity and correctness of route data negotiation during the on-line upgrading process are ensured, the amount of data exchanged over the network is reduced, the repetition and redundancy of database update performed by the Diameter nodes are reduced, the robustness of network connection and system processing is improved, and the stability is enhanced.

DETAILED DESCRIPTION OF THE EMBODIMENTS

When message routing is performed among Diameter nodes, in order to ensure that an AAA message is routed to a correct Diameter node for processing, a device capability exchange needs to be performed between two Diameter nodes to notify each other of supported device capability information before a connection is established between the Diameter nodes, and only Diameter nodes supporting relevant capability information can process the corresponding message. The device capability information includes:

(1) Supported protocol versions;
(2) Supported Diameter application information, in which the existing Diameter nodes can support five basic applications, namely, Diameter Common Messages, NASREQ, Mobile IP, Diameter Base Accounting, and Relay, as well as some other Diameter extension applications;
(3) Supported security mechanisms, and the like.

With the further development of networks, Diameter-based applications grow rapidly, Diameter has become the most important interface protocol in telecommunication networks, and capabilities of a Diameter node may be dynamically adjusted, for example, the Diameter node may be upgraded on-line, so as to improve processing capability. Therefore, how to perform a device capability exchange between Diameter nodes when the capabilities of a Diameter node are dynamically adjusted is of great interest to all manufacturers.

The present invention provides a method for device capabilities exchange. When device capabilities of a Diameter node are changed, the Diameter node sends a device capability exchange request carrying latest device capability information to all Diameter nodes connected thereto, and each receiver returns a device capability exchange answer according to a state of a state machine thereof or a request type.

Figure 1:
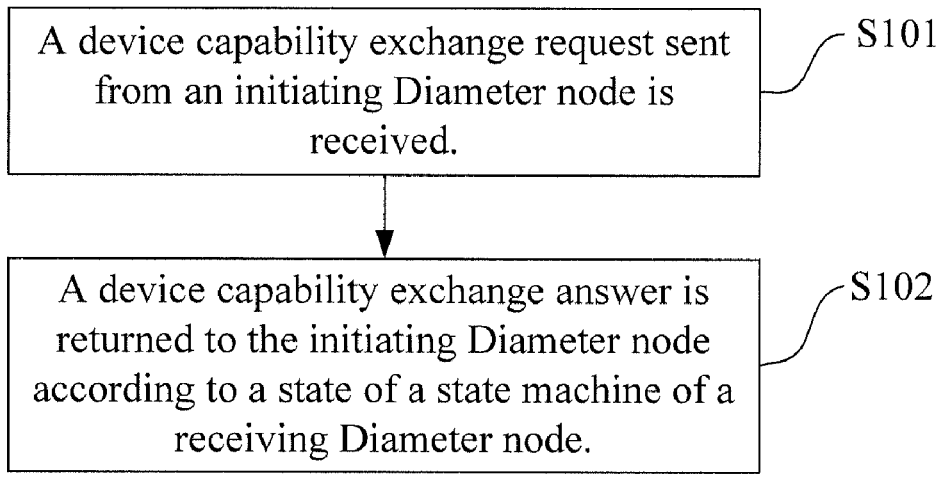
FIG. 1 is a flow chart of a method for device capabilities exchange according to an embodiment of the present invention.

FIG. 1 is a flow chart of a method for device capabilities exchange according to an embodiment of the present invention, which includes the following steps.

In Step S101, a device capability exchange request sent from an initiating Diameter node is received. When the initiating Diameter node detects that device capabilities thereof are changed, the initiating Diameter node sends a device capability exchange request to all nodes connected to the initiating Diameter node, in which the device capability exchange request carries device capability information of the initiating Diameter node.

In Step S102, a device capability exchange answer is returned to the initiating Diameter node according to a state of a state machine of a receiving Diameter node.

After receiving the device capability exchange request sent from the initiating Diameter node, the receiving Diameter node buffers all or a portion of the device capability information of the initiating Diameter node carried in the device capability exchange request, when the device capability exchange is performed when a Diameter connection is initially established. Buffer means that the receiving Diameter node stores all or a portion of the device capability information of the initiating Diameter node, and can subsequently update the device capability information of the initiating Diameter node according to all or the portion of the device capability information of the initiating Diameter node stored therein.

The receiving Diameter node updates the buffered device capability information of the initiating Diameter node according to the device capability information carried in the device capability exchange request, when the device capability exchange is performed after the Diameter connection is established.

The update of the device capability information of the initiating Diameter node by the receiving Diameter node may be an optional step according to specific implementations. The device capability exchange performed by a Diameter node mainly aims to route a message according to capabilities of Diameter nodes connected to the Diameter node, so as to ensure that the message can reach Diameter nodes capable of processing the message.

Then, the receiving Diameter node determines the state of the state machine thereof, and if the state of the state machine of the receiving Diameter node indicates a connection established state, showing that the Diameter connection has been established, the device capability exchange answer returned by the receiving Diameter node carries a status code, indicating that the update is successful.

When the state of the state machine of the receiving Diameter node indicates an initial connection establishment state, showing that the Diameter connection has not been established, the device capability exchange answer returned by the receiving Diameter node carries a status code and device capability information of the receiving Diameter node.

After receiving the device capability exchange answer returned by the receiving Diameter node, the initiating Diameter node determines a state of a state machine thereof, and if the state of the state machine of the initiating Diameter node indicates a connection established state, the initiating Diameter node does not need to update a device capability information database, and connects a session by using negotiated device capability information; and if the state of the state machine of the initiating Diameter node indicates an initial connection establishment state, the initiating Diameter node updates the device capability information database according to the device capability information of the receiving Diameter node in the device capability exchange answer.

Alternatively, the initiating Diameter node updates the capability information of the receiving Diameter node according to the status code carried in the returned device capability exchange answer, and if the status code indicates that the capability information of the receiving Diameter node is not changed and the device capability information database does not need to be updated, the initiating Diameter node does not need to update the device capability information database, and connects a session by using negotiated device capability information.

The update of the device capability information of the initiating Diameter node by the receiving Diameter node may be an optional step according to specific implementations. The device capability exchange performed by a Diameter node mainly aims to route a message according to capabilities of Diameter nodes connected to the Diameter node, so as to ensure that the message can reach Diameter nodes capable of processing the message.

In the method for device capabilities exchange, when the device capabilities of the initiating Diameter node are changed, the initiating Diameter node sends a device capability exchange request carrying latest device capability information to all Diameter nodes connected thereto, and the receiving Diameter node returns a device capability exchange answer according to the state of the state machine thereof Thus, the existing method for updating and negotiating device capability information when a Diameter device is upgraded is optimized, the validity and correctness of route data negotiation during the on-line upgrading process are ensured, the amount of data exchanged over the network is reduced, the repetition and redundancy of database update performed by the Diameter nodes are reduced, the robustness of network connection and system processing is improved, and the stability is enhanced.

Figure 2:
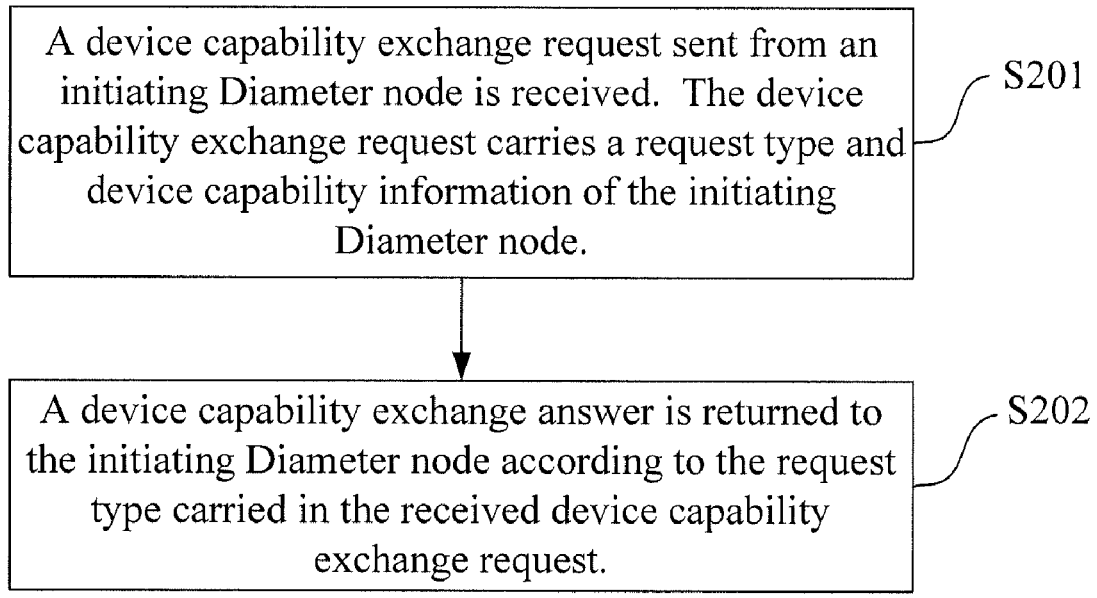
FIG. 2 is a flow chart of another method for device capabilities exchange according to an embodiment of the present invention.

FIG. 2 is a flow chart of another method for device capabilities exchange according to an embodiment of the present invention. In the embodiment of the present invention, the Diameter node adds a request type field in the device capability exchange request, so as to indicate a status in which the device capability exchange request is sent. Referring to FIG. 2, the method specifically includes the following steps.

In Step S201, a device capability exchange request sent from an initiating Diameter node is received. The device capability exchange request carries a request type and device capability information of the initiating Diameter node. When the initiating Diameter node detects that device capabilities thereof are changed, the initiating Diameter node sends a device capability exchange request to all nodes connected to the initiating Diameter node, in which the device capability exchange request carries a request type and latest device capability information.

In Step S202, a device capability exchange answer is returned to the initiating Diameter node according to the request type carried in the received device capability exchange request.

After receiving the device capability exchange request sent from the initiating Diameter node, the receiving Diameter node buffers all or a portion of the device capability information of the initiating Diameter node carried in the device capability exchange request, when the device capability exchange is performed when a Diameter connection is initially established.

The receiving Diameter node updates the buffered device capability information of the initiating Diameter node according to the device capability information carried in the device capability exchange request, when the device capability exchange is performed after the Diameter connection is established.

The update of the device capability information of the initiating Diameter node by the receiving Diameter node may be an optional step according to specific implementations. The device capability exchange performed by a Diameter node mainly aims to route a message according to capabilities of Diameter nodes connected to the Diameter node, so as to ensure that the message can reach Diameter nodes capable of processing the message.

Then, the receiving Diameter node determines the request type carried in the received device capability exchange request, and if the request type indicates a device capability exchange after the connection is established, showing that the device capability exchange request is a device capability negotiation message after the connection is established, the device capability exchange answer returned by the receiving Diameter node carries a request type and a status code; and if the request type indicates an initially-connected device capability exchange, showing that the device capability exchange request is an initial device capability negotiation message, the device capability exchange answer returned by the receiving Diameter node carries a request type, a status code and device capability information of the receiving Diameter node.

After the initiating Diameter node receives the device capability exchange answer, when the request type carried in the device capability exchange answer indicates a device capability exchange after the connection is established, the initiating Diameter node does not need to update a device capability information database, and connects a session by using negotiated device capability information; and when the request type carried in the device capability exchange answer indicates an initially-connected device capability exchange, the initiating Diameter node updates the device capability information database according to the device capability information of the receiving Diameter node in the device capability exchange answer.

Alternatively, the initiating Diameter node updates the capability information of the receiving Diameter node according to the status code carried in the returned device capability exchange answer, and if the status code indicates that the device capabilities of the receiving Diameter node are not changed and the device capability information database does not need to be updated, the initiating Diameter node does not need to update the device capability information database, and connects a session by using negotiated device capability information.

The update of the device capability information of the initiating Diameter node by the receiving Diameter node may be an optional step according to specific implementations. The device capability exchange performed by a Diameter node mainly aims to route a message according to capabilities of Diameter nodes connected to the Diameter node, so as to ensure that the message can reach Diameter nodes capable of processing the message.

In the method for device capabilities exchange, when the device capabilities of the initiating Diameter node are changed, the initiating Diameter node sends a device capability exchange request carrying latest device capability information to all Diameter nodes connected thereto, and the receiving Diameter node returns a device capability exchange answer according to the request type carried in the device capability exchange answer. Thus, the existing method for updating and negotiating device capability information when a Diameter device is upgraded is optimized, the validity and correctness of route data negotiation during the on-line upgrading process are ensured, the amount of data exchanged over the network is reduced, the repetition and redundancy of database update performed by the Diameter nodes are reduced, the robustness of network connection and system processing is improved, and the stability is enhanced.

In the descriptions of the following embodiments, the receiving Diameter node is a Diameter relay, the initiating Diameter node is a Diameter redirector, and as an example of the device capability information, the Diameter nodes support NASREQ and Credit Control (CC) applications; however, the embodiments of the present invention are not limited thereto, the receiving Diameter node may also be a Diameter redirector, a Diameter proxy or another Diameter node, and the initiating Diameter node may also be a Diameter relay, a Diameter client or another Diameter node, which will not affect the implementation of the embodiments of the present invention.

Figure 3:
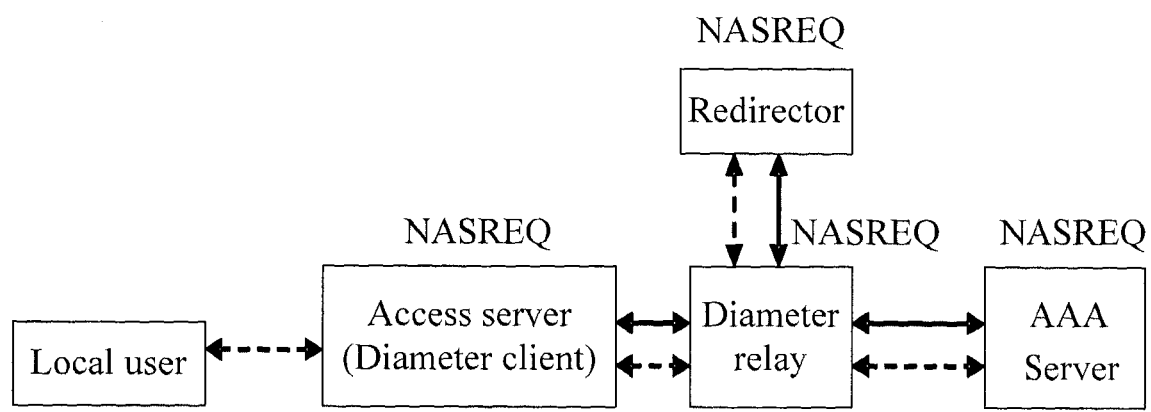
FIG. 3 is a schematic view of an application scenario of a method for device capabilities exchange according to an embodiment of the present invention.
Figure 4:
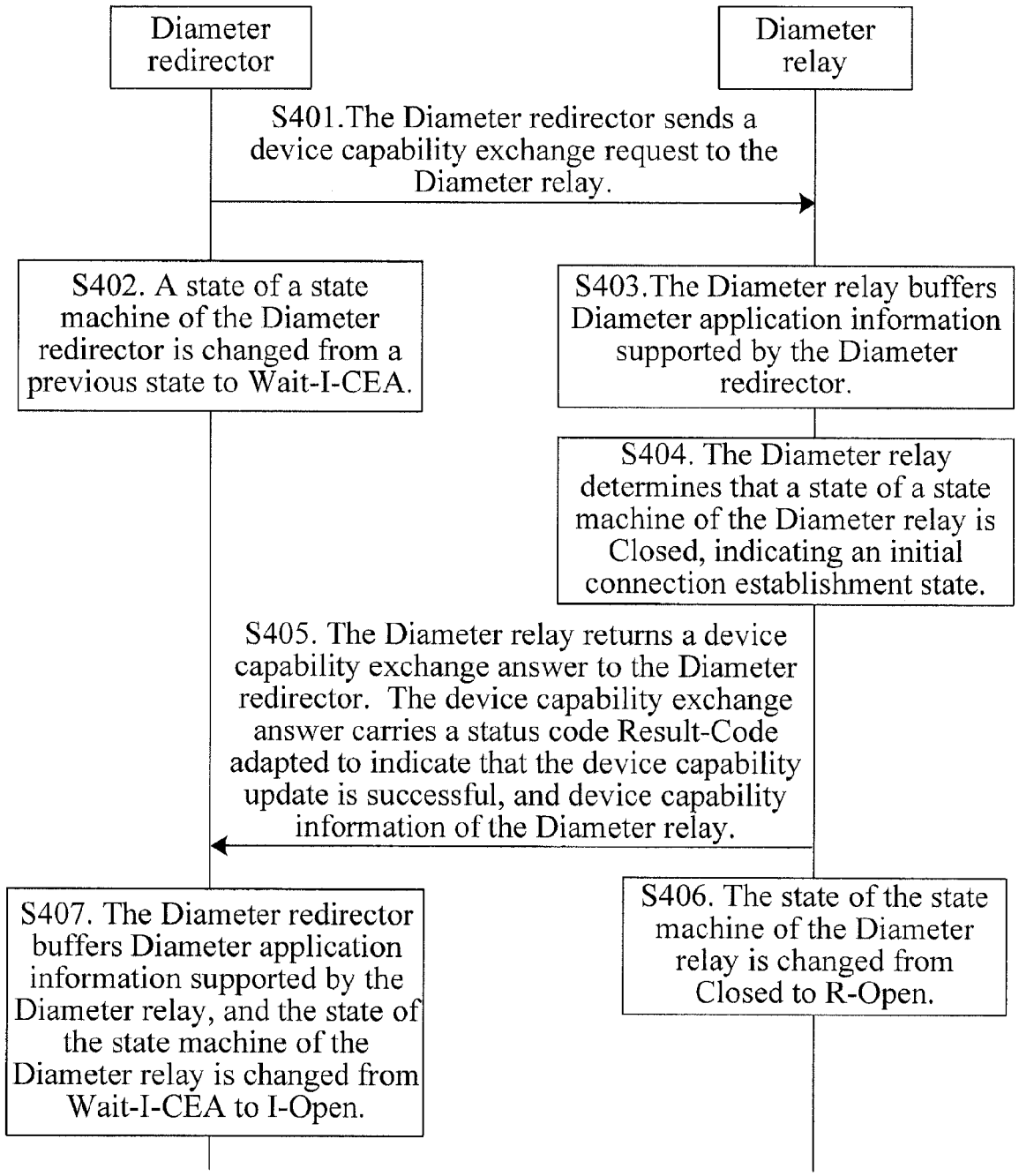
FIG. 4 is a schematic view of a process in which a Diameter redirector and a Diameter relay performs a device capability exchange and establishes a Diameter connection according to an embodiment of the present invention.

FIG. 3 is a schematic view of an application scenario of a method for device capabilities exchange according to an embodiment of the present invention. When a connection is initially established, an access server (with a Diameter client), a Diameter redirector and a Diameter relay all support the NASREQ application, such that a NASREQ-related message may be routed to an AAA Server for processing through the three Diameter nodes. In order to ensure that the NASREQ-related message can be routed correctly, two of the three Diameter nodes that are connected to each other need to perform a device capability exchange. A process in which a Diameter redirector and a Diameter relay performs a device capability exchange and establishes a Diameter connection is described below as an example. FIG. 4 is a schematic view of a process in which a Diameter redirector and a Diameter relay performs a device capability exchange, which specifically includes the following steps.

In Step S401, the Diameter redirector sends a device capability exchange request to the Diameter relay. The device capability exchange request carries device capability information of the Diameter redirector.

In Step S402, a state of a state machine of the Diameter redirector is changed from a previous state to Wait-I-CEA (Capability Exchange answer). After the Diameter redirector sends the device capability exchange request to the Diameter relay, the state of the state machine of the Diameter redirector is changed from the previous state to Wait-I-CEA, that is, to a state of waiting for a device capability exchange answer.

Since the initiating Diameter node may be in a certain intermediate state of the state machine before sending the device capability exchange request, the initiating Diameter node is switched from the previous state to the state of waiting for a device capability exchange answer after sending the device capability exchange request.

In Step S403, the Diameter relay buffers Diameter application information supported by the Diameter redirector. After receiving the device capability exchange request sent from the Diameter redirector, the Diameter relay buffers the device capability information of the Diameter redirector.

In Step S404, the Diameter relay determines that a state of a state machine of the Diameter relay is Closed, indicating an initial connection establishment state.

In Step S405, the Diameter relay returns a device capability exchange answer to the Diameter redirector.

Since the Diameter relay determines that the state of the state machine of the Diameter relay is Closed, indicating the initial connection establishment state, the device capability exchange answer returned by the Diameter relay carries a status code Result-Code adapted to indicate that the device capability update is successful, and device capability information of the Diameter relay.

In Step S406, the state of the state machine of the Diameter relay is changed from Closed to R-Open. After the device capability exchange answer is returned, the state of the state machine of the Diameter relay is changed from Closed to R-Open, that is, is changed from the closed state to an open state, and the Diameter relay establishes a Diameter connection with the Diameter redirector.

In Step S407, the Diameter redirector buffers Diameter application information supported by the Diameter relay. After receiving the device capability exchange answer sent from the Diameter relay, the Diameter redirector determines that the state of the state machine of the Diameter redirector is Wait-I-CEA, indicating a state of waiting for a device capability exchange answer, so that the Diameter redirector buffers the device capability information of the Diameter relay. In addition, the state of the state machine of the Diameter relay is changed from Wait-I-CEA to I-Open, that is, is changed from the state of waiting for a device capability exchange answer to the open state, and the Diameter redirector establishes a Diameter connection with the Diameter relay.

Wait-I-CEA, I-Open, and R-Open are three state values of the state machine, and may be adapted to represent the state of the current connection process in the embodiments of the present invention. When the state of the state machine is Wait-I-CEA, it means that the connection process is in an initial connection state; and when the state of the state machine is R-Open or I-Open, it means that the connection process is in a connection established state, in which the prefix "R-" indicates a condition of the receiving Diameter node, and the prefix "I-" indicates a condition of the initiating Diameter node. R-Open and I-Open indicate that the receiving Diameter node and the initiating Diameter node are respectively in the connection established state.

However, the embodiments of the present invention are not limited thereto, and in actual application scenarios, other state values of the state machine may also be used to represent the state of the connection process, for example, state values Wait-Conn-Ack and Elect may also represent the initial connection establishment state, all of which fall within the protection scope of the embodiments of the present invention.

Figure 5:
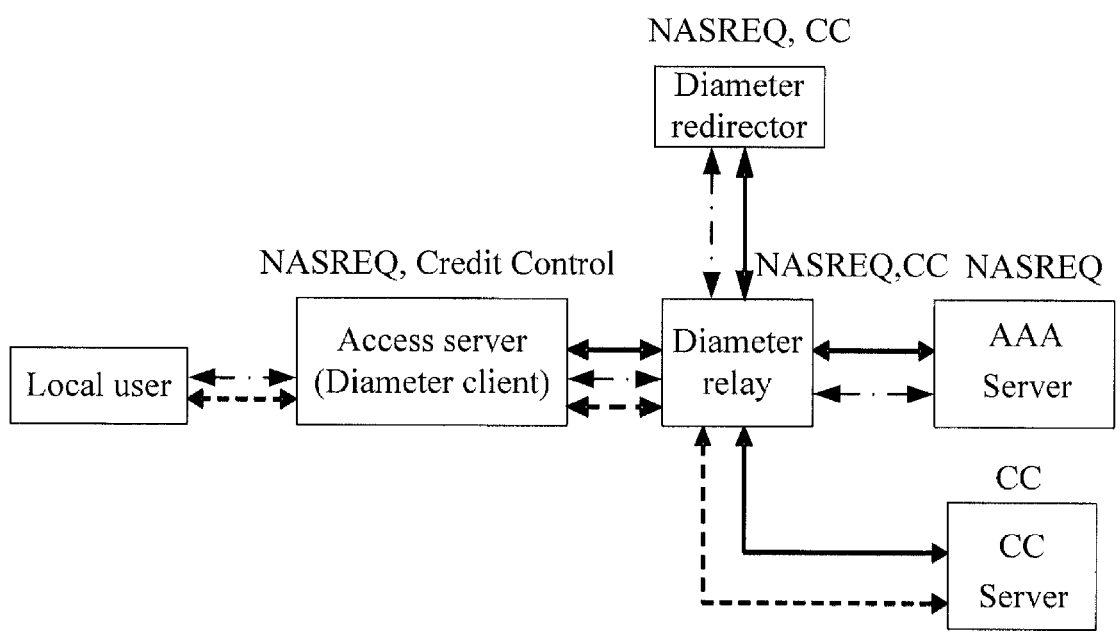
FIG. 5 is a schematic view of routing of a Credit Control (CC)-related message according to an embodiment of the present invention.

In order to perform more processing, operators update the device capabilities of the three Diameter nodes, so as to enable the access server, the Diameter redirector and the Diameter relay to support NASREQ and CC applications, such that a CC-related message may also be routed through the three Diameter nodes. As shown in FIG. 5, solid lines represent device capability exchange message routing, dashed lines represent CC message routing, and dotted and dashed lines represent NASREQ message routing.

Figure 6A:
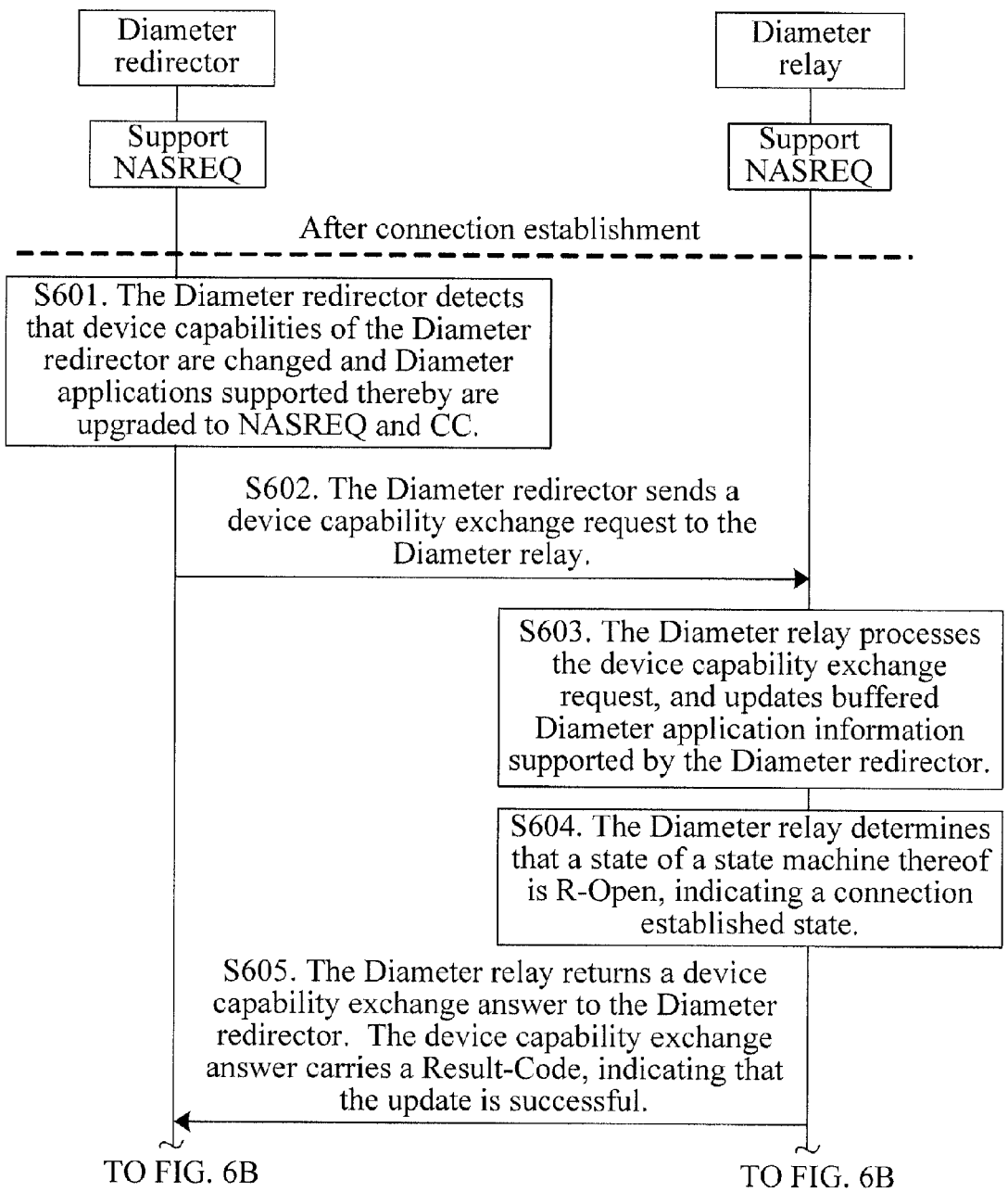
FIGS. 6A and 6B are a schematic view of a device capability exchange process when device capabilities of a Diameter node are upgraded according to an embodiment of the present invention.
Figure 6B:
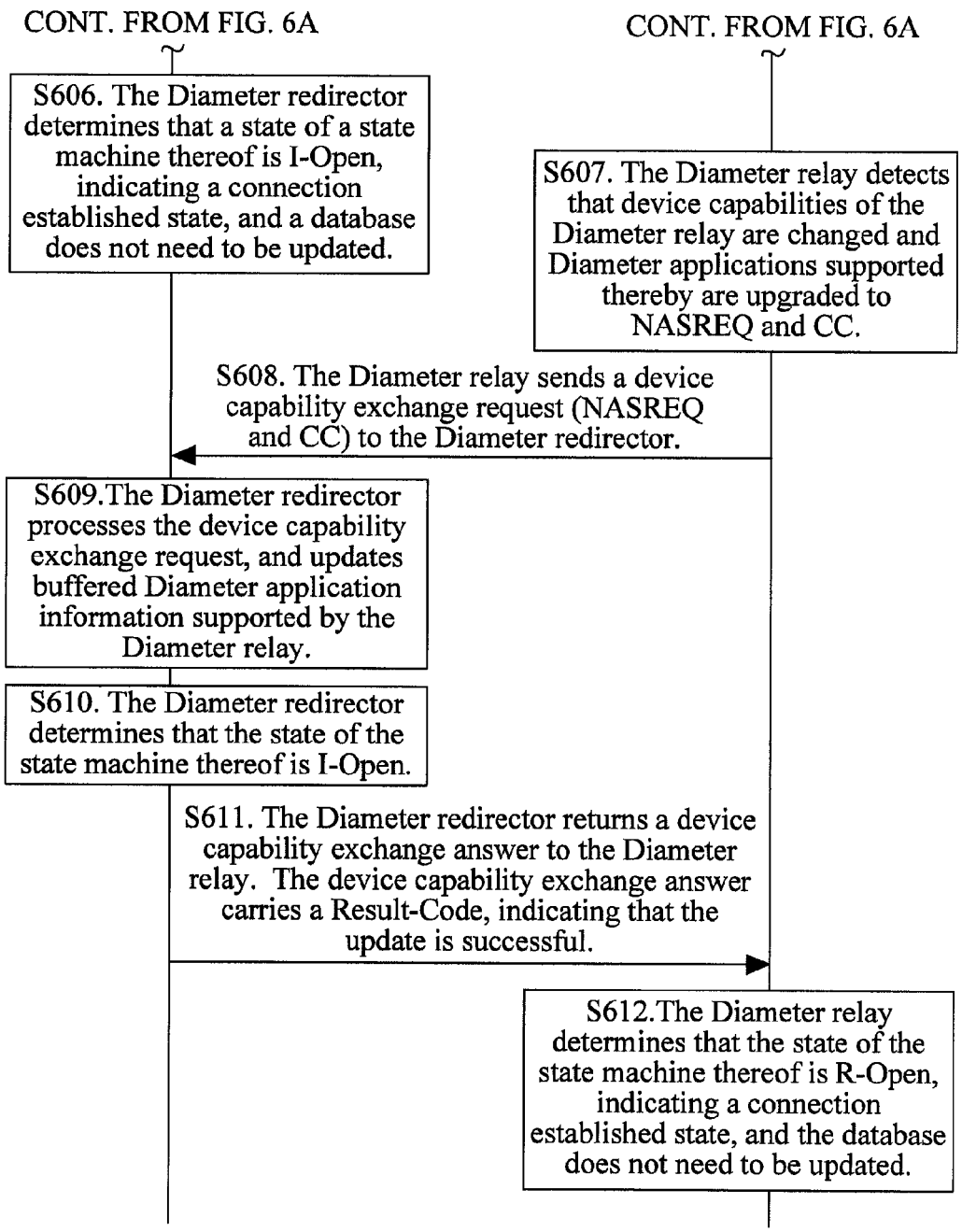

When the Diameter redirector and the Diameter relay initialize a Diameter connection, the Diameter redirector and the Diameter relay exchange device capability information, and establish a Diameter connection. A device capability exchange process when device capabilities of a Diameter node are upgraded is as shown by FIGS. 6A and 6B, and a process in which a Diameter redirector and a Diameter relay performs a device capability exchange is described below as an example. The process specifically includes the following steps.

In Step S601, the Diameter redirector detects that device capabilities of the Diameter redirector are changed and Diameter applications supported thereby are upgraded to NASREQ and CC.

In Step S602, the Diameter redirector sends a device capability exchange request to the Diameter relay. The device capability exchange request carries device capability information of the Diameter redirector, that is, NASREQ and CC.

In Step S603, the Diameter relay processes the device capability exchange request, and updates buffered Diameter application information supported by the Diameter redirector.

In Step S604, the Diameter relay determines that a state of a state machine thereof is R-Open, indicating a connection established state.

In Step S605, the Diameter relay returns a device capability exchange answer to the Diameter redirector. The device capability exchange answer carries a Result-Code, indicating that the update is successful.

In Step S606, the Diameter redirector determines that a state of a state machine thereof is I-Open, indicating a connection established state, and a device capability information database does not need to be updated.

In Step S607, the Diameter relay detects that device capabilities of the Diameter relay are changed and Diameter applications supported thereby are upgraded to NASREQ and CC.

In Step S608, the Diameter relay sends a device capability exchange request to the Diameter redirector. The device capability exchange request carries device capability information of the Diameter relay, that is, supported Diameter applications NASREQ and CC.

In Step S609, the Diameter redirector processes the device capability exchange request, and updates buffered Diameter application information supported by the Diameter relay.

In Step S610, the Diameter redirector determines that the state of the state machine thereof is I-Open, indicating a connection established state.

In Step S611, the Diameter redirector returns a device capability exchange answer to the Diameter relay. The device capability exchange answer carries a Result-Code, indicating that the update is successful.

In Step S612, the Diameter relay determines that the state of the state machine thereof is R-Open, indicating a connection established state, and the device capability information database does not need to be updated.

In the embodiment of the method for device capabilities exchange, the Diameter redirector and the Diameter relay perform a device capability exchange, and the Diameter relay and the Diameter redirector return a device capability exchange answer to each other according to the states of the state machines thereof. Thus, the existing method for updating and negotiating device capability information when a Diameter device is upgraded is optimized, the validity and correctness of route data negotiation during the on-line upgrading process are ensured, the amount of data exchanged over the network is reduced, the repetition and redundancy of database update performed by the Diameter nodes are reduced, the robustness of network connection and system processing is improved, and the stability is enhanced.

Figure 7A:
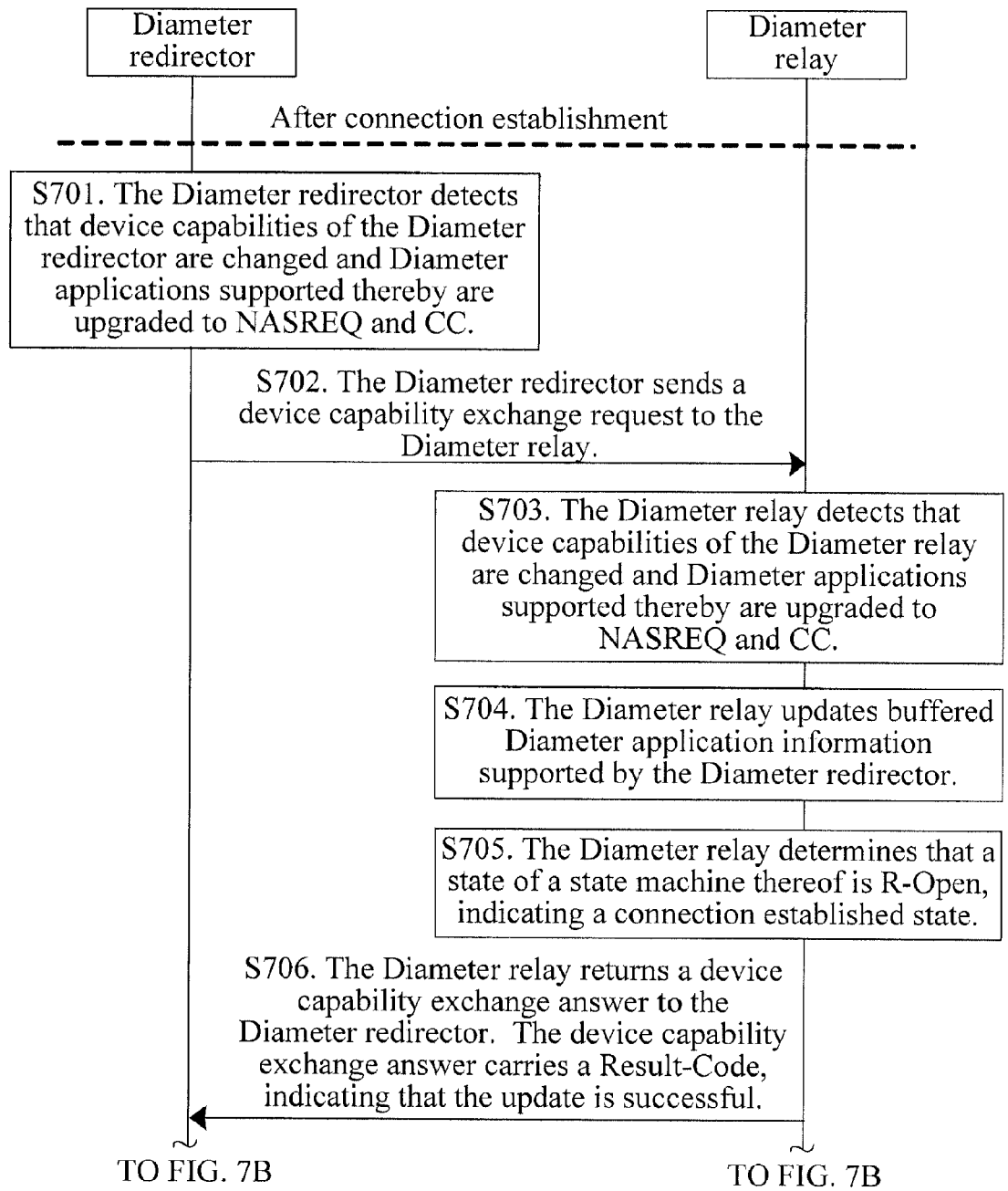
FIGS. 7A and 7B are a schematic view of another device capability exchange process according to an embodiment of the present invention.
Figure 7B:
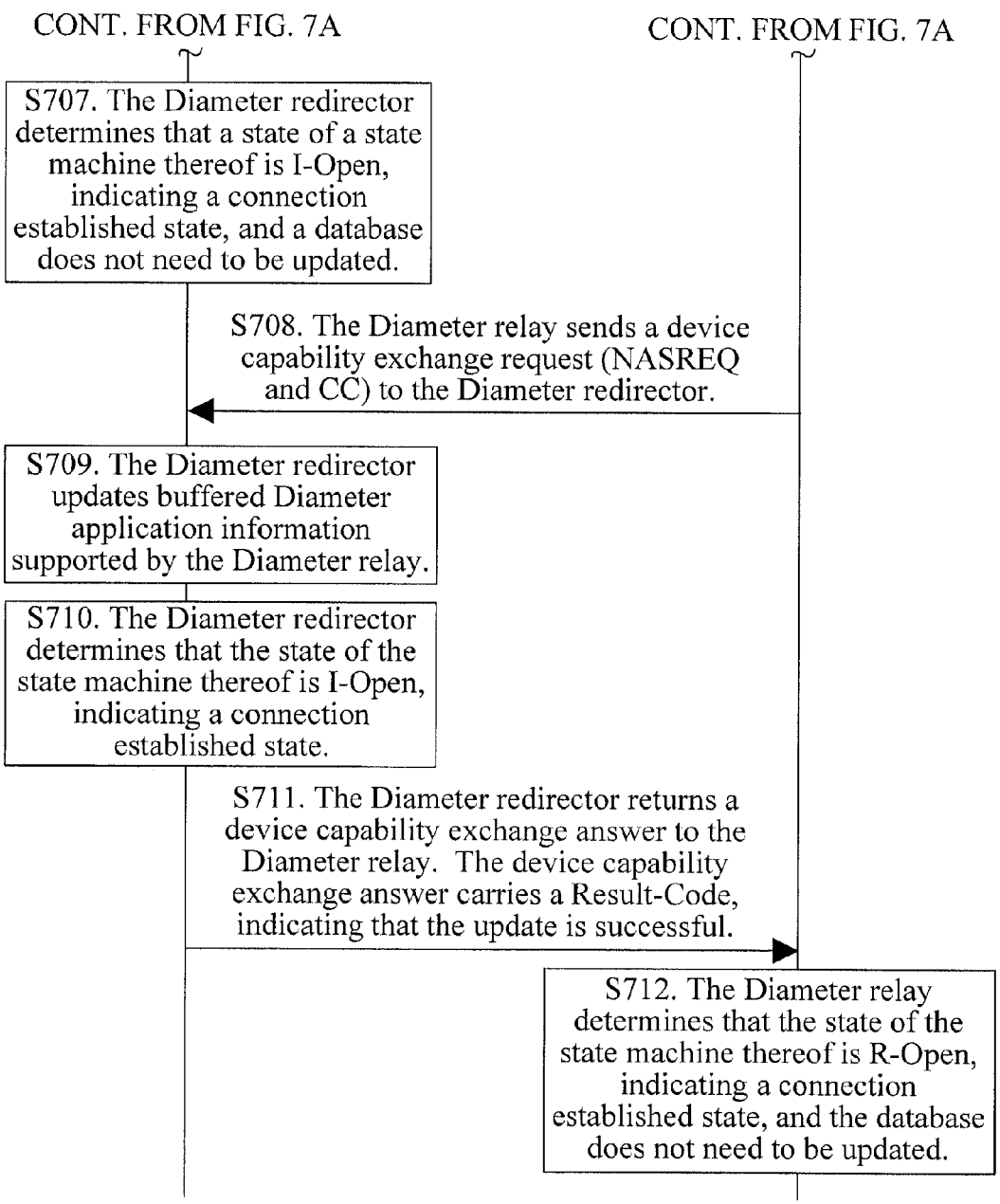

In the scenario as shown in FIG. 5, if the Diameter relay finds that the device capabilities of the Diameter relay are changed after receiving the device capability exchange request from the Diameter redirector, the device capability exchange process specifically includes the following steps, as shown in FIGS. 7A and 7B.

In Step S701, the Diameter redirector detects that device capabilities of the Diameter redirector are changed and Diameter applications supported thereby are upgraded to NASREQ and CC.

In Step S702, the Diameter redirector sends a device capability exchange request to the Diameter relay. The device capability exchange request carries device capability information of the Diameter redirector, that is, NASREQ and CC.

In Step S703, the Diameter relay detects that device capabilities of the Diameter relay are changed and Diameter applications supported thereby are upgraded to NASREQ and CC.

In Step S704, the Diameter relay updates buffered Diameter application information supported by the Diameter redirector.

In Step S705, the Diameter relay determines that a state of a state machine thereof is R-Open, indicating a connection established state.

In Step S706, the Diameter relay returns a device capability exchange answer to the Diameter redirector. The device capability exchange answer carries a Result-Code, indicating that the update is successful.

In Step S707, the Diameter redirector determines that a state of a state machine thereof is I-Open, indicating a connection established state, and a device capability information database does not need to be updated.

In Step S708, the Diameter relay sends a device capability exchange request to the Diameter redirector. The device capability exchange request carries device capability information of the Diameter relay, that is, supported Diameter applications NASREQ and CC.

In Step S709, the Diameter redirector updates buffered Diameter application information supported by the Diameter relay.

In Step S710, the Diameter redirector determines that the state of the state machine thereof is I-Open, indicating a connection established state.

In Step S711, the Diameter redirector returns a device capability exchange answer to the Diameter relay. The device capability exchange answer carries a Result-Code, indicating that the update is successful.

In Step S712, the Diameter relay determines that the state of the state machine thereof is R-Open, indicating a connection established state, and the device capability information database does not need to be updated.

I-Open and R-Open are two state values of the state machine, and may be adapted to represent the connection established state of the current connection process in the embodiments of the present invention.

However, the embodiments of the present invention are not limited thereto, and in actual application scenarios, other state values of the state machine may also be used to represent the state of the connection process, all of which fall within the protection scope of the embodiments of the present invention.

In the embodiment of the method for device capabilities exchange, the Diameter redirector and the Diameter relay perform a device capability exchange, and when the Diameter relay finds that the device capabilities of the Diameter relay are changed after receiving a device capability exchange request from the Diameter redirector, the Diameter relay sends a device capability exchange request to the Diameter redirector, and the Diameter redirector returns a device capability exchange answer to the Diameter relay according to the state of the state machine thereof. Thus, the existing method for updating and negotiating device capability information when a Diameter device is upgraded is optimized, the validity and correctness of route data negotiation during the on-line upgrading process are ensured, the amount of data exchanged over the network is reduced, the repetition and redundancy of database update performed by the Diameter nodes are reduced, the robustness of network connection and system processing is improved, and the stability is enhanced.

Figure 8A:
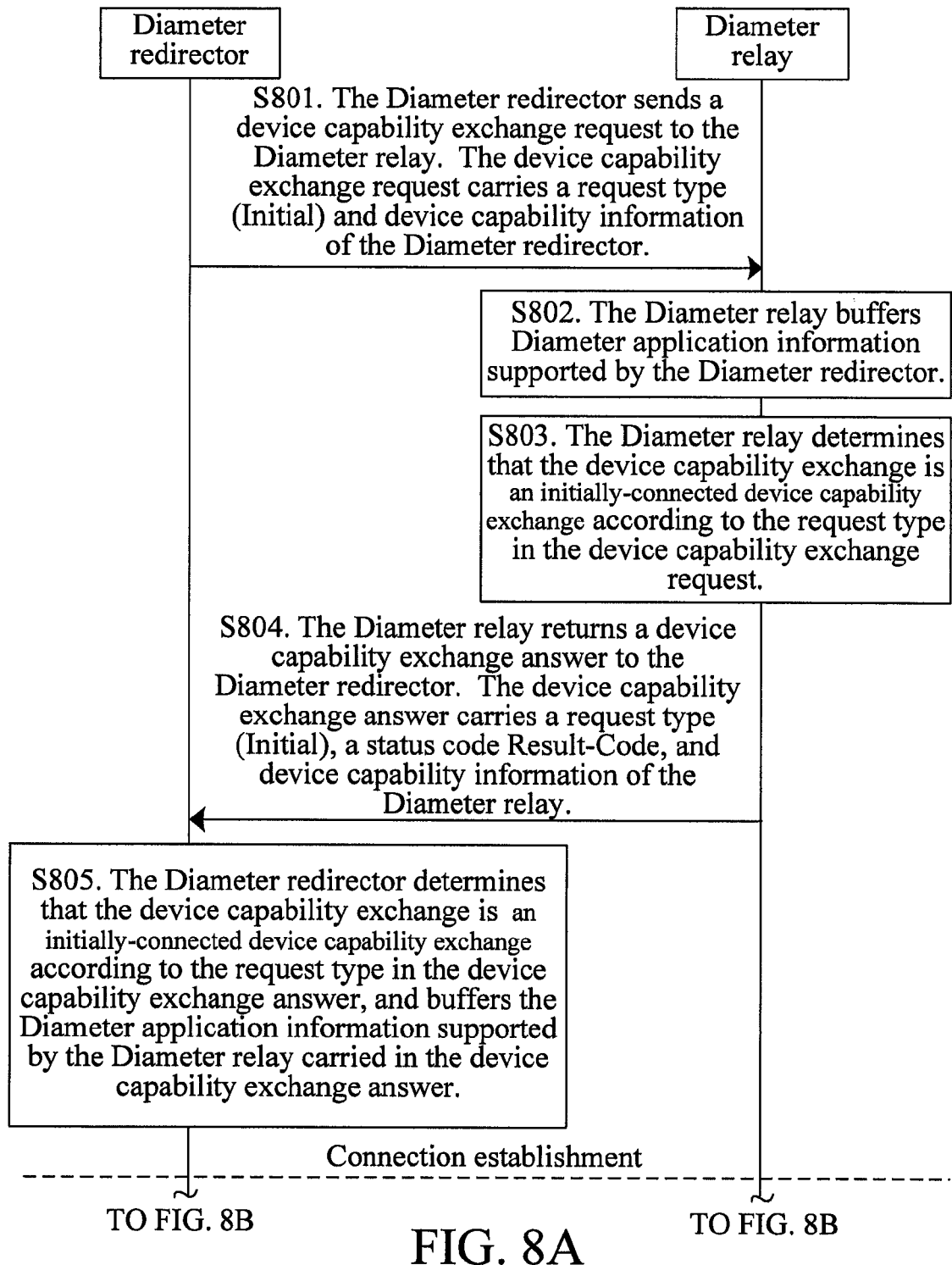
FIGS. 8A and 8B are a flow chart of performing device capability negotiation according to a request type according to an embodiment of the present invention.
Figure 8B:
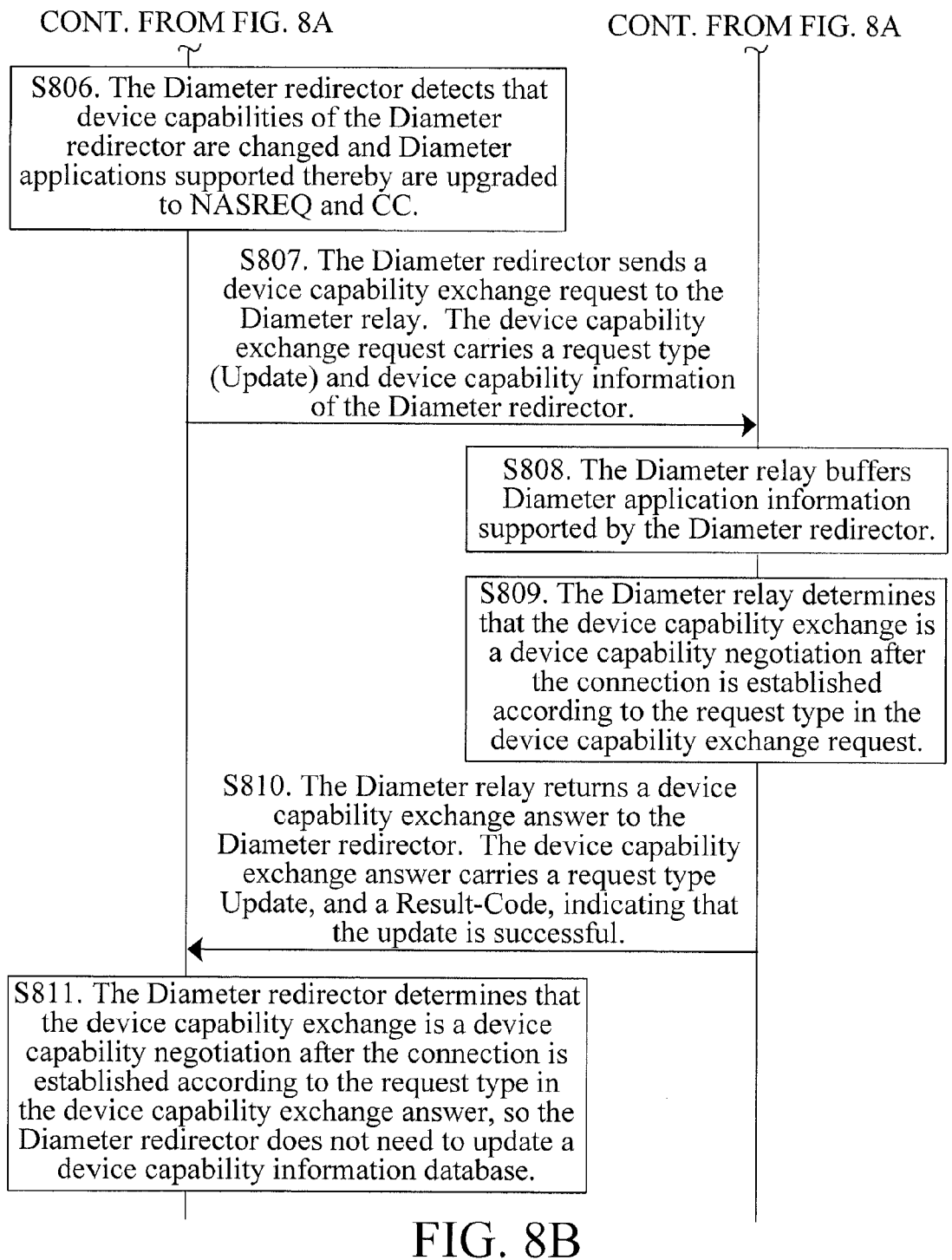

FIGS. 8A and 8B are a flow chart of performing device capability negotiation according to a request type according to an embodiment of the present invention, which specifically includes the following steps.

In Step S801, the Diameter redirector sends a device capability exchange request to the Diameter relay. The device capability exchange request carries a request type and device capability information of the Diameter redirector. At this time, the request type in the device capability exchange request is Initial, indicating that the device capability exchange request is an initially-connected device capability exchange.

In Step S802, the Diameter relay buffers Diameter application information supported by the Diameter redirector. After receiving the device capability exchange request sent from the Diameter redirector, the Diameter relay buffers the device capability information carried in the received device capability exchange request.

In Step S803, the Diameter relay determines that the device capability exchange is an initially-connected device capability exchange according to the request type in the device capability exchange request.

In Step S804, the Diameter relay returns a device capability exchange answer to the Diameter redirector. The device capability exchange answer carries a request type, a status code Result-Code, and device capability information of the Diameter relay. The request type carried in the device capability exchange answer is Initial, and the status code Result-Code is adapted to indicate that the update of the device capability information is successful.

In Step S805, the Diameter redirector determines that the device capability exchange is an initially-connected device capability exchange according to the request type in the device capability exchange answer, and buffers the Diameter application information supported by the Diameter relay carried in the device capability exchange answer, so as to establish a Diameter connection with the Diameter relay.

In Step S806, the Diameter redirector detects that device capabilities of the Diameter redirector are changed and Diameter applications supported thereby are upgraded to NASREQ and CC.

In Step S807, the Diameter redirector sends a device capability exchange request to the Diameter relay. The device capability exchange request carries a request type and device capability information of the Diameter redirector. The request type carried is Update, indicating a device capability exchange after the connection is established.

In Step S808, the Diameter relay buffers Diameter application information supported by the Diameter redirector. After receiving the device capability exchange request sent from the Diameter redirector, the Diameter relay buffers the Diameter application information supported by the Diameter redirector carried in the device capability exchange request.

In Step S809, the Diameter relay determines that the device capability exchange is a device capability exchange after the connection is established according to the request type in the device capability exchange request.

In Step S810, the Diameter relay returns a device capability exchange answer to the Diameter redirector. The device capability exchange answer carries a request type Update and a status code Result-Code. The request type Update represents a device capability exchange after the connection is established, and the status code Result-Code is adapted to indicate that the update of the device capability information is successful.

In Step S811, the Diameter redirector determines that the device capability exchange is a device capability exchange after the connection is established according to the request type in the device capability exchange answer, so the Diameter redirector does not need to update a device capability information database thereof.

In the embodiment of the method for device capabilities exchange, the Diameter redirector and the Diameter relay perform device capability exchange, and the Diameter redirector and the Diameter relay return a device capability exchange answer to each other according to the request type in the device capability exchange request, and update the device capability information database according to the request type. Thus, the existing method for updating and negotiating device capability information when a Diameter device is upgraded is optimized, the validity and correctness of route data negotiation during the on-line upgrading process are ensured, the amount of data exchanged over the network is reduced, the repetition and redundancy of database update performed by the Diameter nodes are reduced, the robustness of network connection and system processing is improved, and the stability is enhanced.

Figure 9:
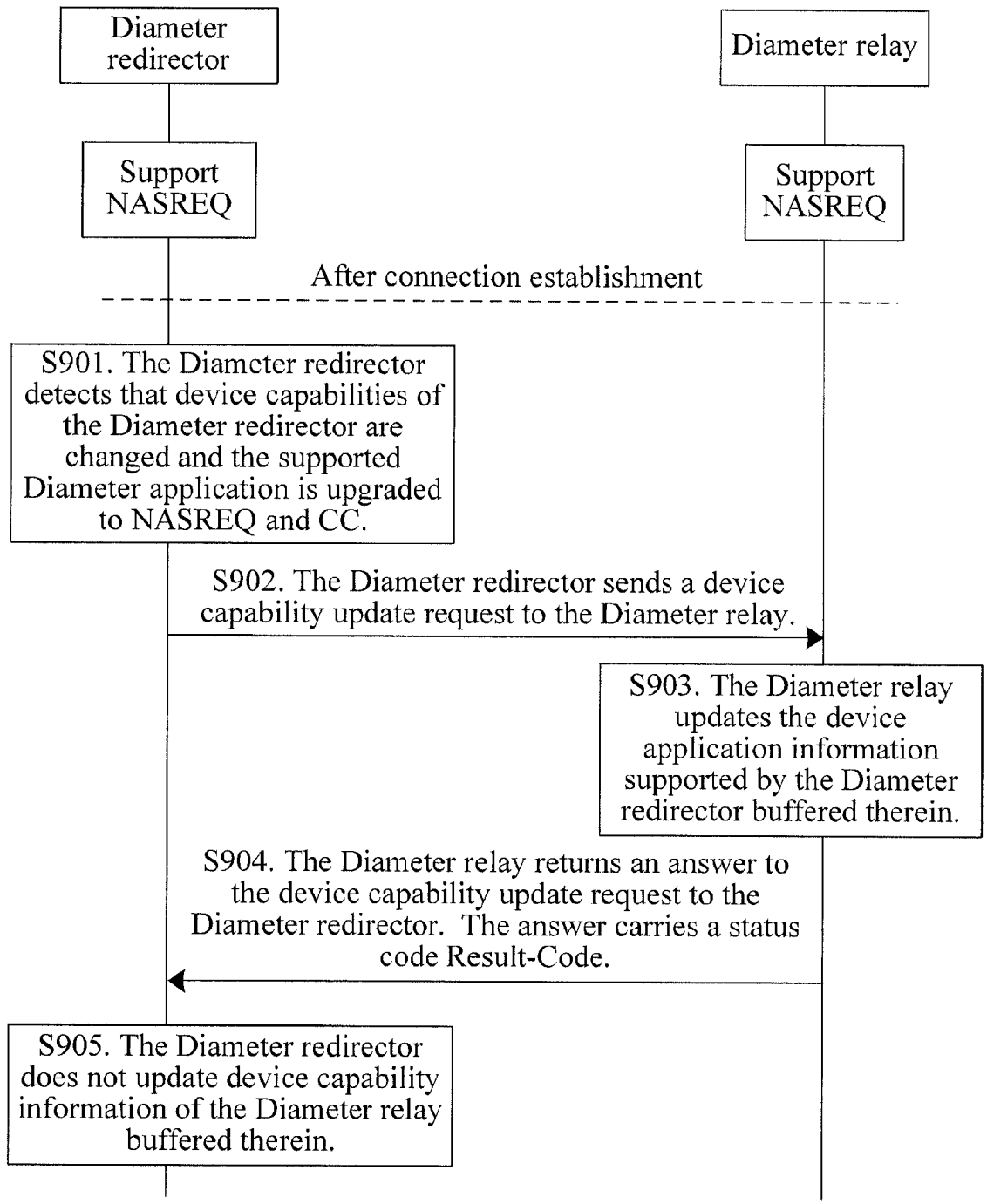
FIG. 9 is a flow chart of performing device capability negotiation according to a device capability update request according to an embodiment of the present invention.

As shown in FIG. 9, when the Diameter redirector and the Diameter relay perform an initial device capability exchange, the Diameter redirector and the Diameter relay merely support the NASREQ application, and after a connection is established, the Diameter redirector detects that device capabilities are upgraded and the supported Diameter application is upgraded to NASREQ and CC. FIG. 9 is a flow chart of performing device capability negotiation according to a device capability update request according to an embodiment of the present invention, which specifically includes the following steps.

In Step S901, after the connection is established, the Diameter redirector detects that device capabilities of the Diameter redirector are changed and the supported Diameter application is upgraded to NASREQ and CC.

In Step S902, the Diameter redirector sends a device capability update request to the Diameter relay. The device capability update request is a new Diameter command, adapted to instruct the Diameter relay to update device capability information of the Diameter redirector buffered therein, and the device capability update request carries updated device capability information of the Diameter redirector (Diameter application information supported by the Diameter redirector).

In Step S903, after receiving the device capability update request sent from the Diameter redirector, the Diameter relay uses the updated Diameter application information supported by the Diameter redirector carried in the device capability update request to update the device application information supported by the Diameter redirector buffered therein.

In Step S904, the Diameter relay returns an answer to the device capability update request to the Diameter redirector. The answer carries a status code Result-Code. The status code Result-Code is adapted to indicate that the update of the device capability information is successful.

In Step S905, the Diameter redirector does not update device capability information of the Diameter relay buffered therein.

In the embodiment of the method for device capabilities exchange, the Diameter redirector and the Diameter relay update the device capability information database according to the device capability update request and the answer thereto. Thus, the existing method for updating and negotiating device capability information when a Diameter device is upgraded is optimized, the validity and correctness of route data negotiation during the on-line upgrading process are ensured, the amount of data exchanged over the network is reduced, the repetition and redundancy of database update performed by the Diameter nodes are reduced, the robustness of network connection and system processing is improved, and the stability is enhanced.

Figure 10:
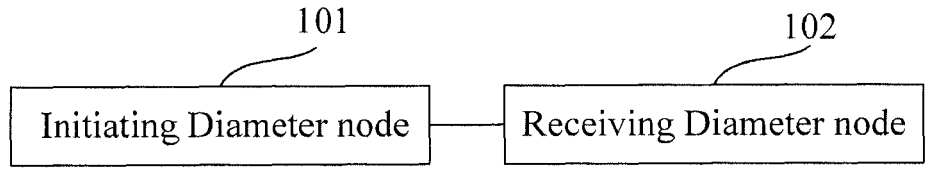
FIG. 10 shows a system for device capabilities exchange according to an embodiment of the present invention.

FIG. 10 shows a system for device capabilities exchange according to an embodiment of the present invention. Referring to FIG. 10, the system includes an initiating Diameter node 101 and a receiving Diameter node 102.

The initiating Diameter node 101 is adapted to send a device capability exchange request, in which the device capability exchange request carries device capability information.

The receiving Diameter node 102 is adapted to return a device capability exchange answer to the initiating Diameter node 101 according to a state of a state machine of the receiving Diameter node 102 or a request type in the device capability exchange request, so as to enable the initiating Diameter node 101 to update a device capability information database of the initiating Diameter node 101.

After receiving the device capability exchange request sent from the initiating Diameter node 101, the receiving Diameter node 102 buffers all or a portion of the device capability information of the initiating Diameter node 101 carried in the device capability exchange request, when the device capability exchange is performed when a Diameter connection is initially established.

Alternatively, the receiving Diameter node 102 updates the buffered device capability information of the initiating Diameter node 101 according to the device capability information carried in the device capability exchange request, when the device capability exchange is performed after the Diameter connection is established. Then, the receiving Diameter node 102 returns the device capability exchange answer to the initiating Diameter node 101 according to the state of the state machine of the receiving Diameter node 102 or the request type in the device capability exchange request.

In the system for device capabilities exchange, the receiving Diameter node 102 receives the device capability exchange request sent from the initiating Diameter node 101, and returns the device capability exchange answer to the initiating Diameter node 101 according to the state of the state machine of the receiving Diameter node 102 or the request type in the device capability exchange request. Thus, the existing method for updating and negotiating device capability information when a Diameter device is upgraded is optimized, the validity and correctness of route data negotiation during the on-line upgrading process are ensured, the amount of data exchanged over the network is reduced, the repetition and redundancy of database update performed by the Diameter nodes are reduced, the robustness of network connection and system processing is improved, and the stability is enhanced.

Figure 11:
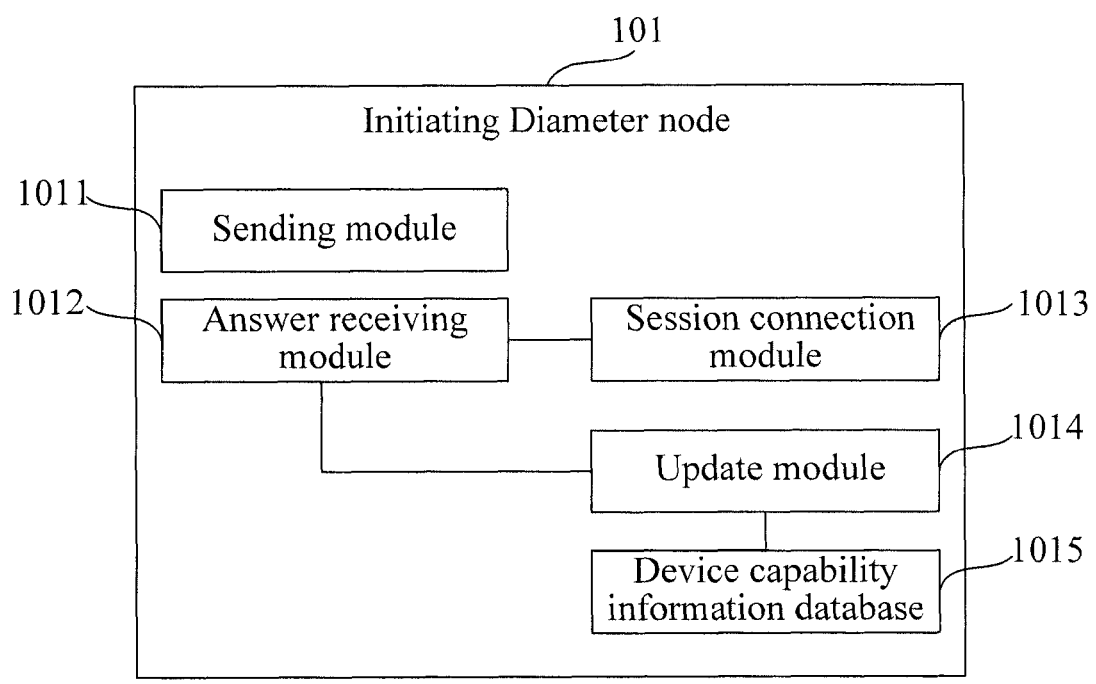
FIG. 11 is a structural view of an initiating Diameter node 101 according to an embodiment of the present invention.

FIG. 11 is a structural view of an initiating Diameter node 101 according to an embodiment of the present invention. Referring to FIG. 11, the initiating Diameter node 101 includes a sending module 1011, an answer receiving module 1012, a session connection module 1013 and an update module 1014.

The sending module 1011 is adapted to send a device capability exchange request to a receiving Diameter node 102, in which the device capability exchange request carries device capability information.

The answer receiving module 1012 is adapted to receive a device capability exchange answer returned by the receiving Diameter node 102.

The session connection module 1013 is adapted to connect a session by using negotiated device capability information, when a state of a state machine of the initiating Diameter node 101 indicates a connection established state or a request type carried in the device capability exchange answer indicates a device capability exchange after a connection is established.

The update module 1014 is adapted to update a device capability information database of the initiating Diameter node 101 according to device capability information of the receiving Diameter node 102 carried in the device capability exchange answer, when the state of the state machine of the initiating Diameter node 101 indicates an initial connection establishment state or the request type carried in the device capability exchange answer indicates an initially-connected device capability exchange.

The initiating Diameter node 101 may further include a device capability information database 1015, adapted to store the device capability information of the receiving Diameter node 102.

For the initiating Diameter node 101, when the device capabilities of the initiating Diameter node 101 are changed, the sending module 1011 sends the device capability exchange request carrying the device capability information to the receiving Diameter node 102, and after the answer receiving module 1012 receives the device capability exchange answer returned by the receiving Diameter node 102, the session connection module 1013 establishes a session connection according to the state of the state machine of the initiating Diameter node 101 or the request type carried in the device capability exchange answer received by the answer receiving module 1012, or the update module 1014 updates the device capability information database of the initiating Diameter node 101. Thus, the existing method for updating and negotiating device capability information when a Diameter device is upgraded is optimized, the amount of data exchanged over the network is reduced, the repetition and redundancy of database update performed by the Diameter nodes are reduced, the robustness of network connection and system processing is improved, and the stability is enhanced.

Figure 12:
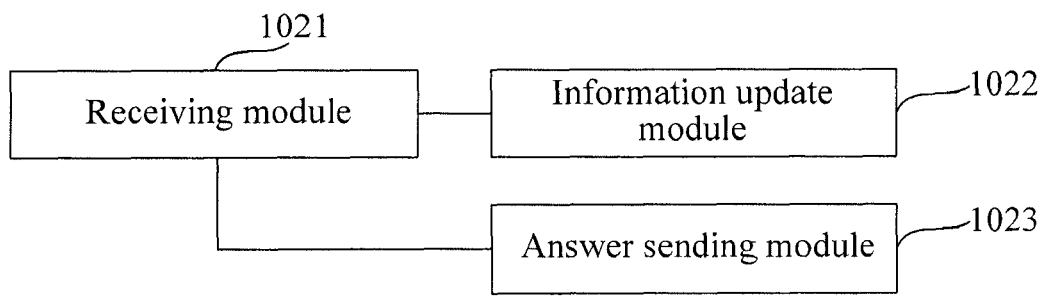
FIG. 12 is a structural view of a receiving Diameter node 102 according to an embodiment of the present invention.

FIG. 12 is a structural view of a receiving Diameter node 102 according to an embodiment of the present invention. Referring to FIG. 12, the receiving Diameter node 102 includes a receiving module 1021, an information update module 1022 and an answer sending module 1023.

The receiving module 1021 is adapted to receive a device capability exchange request sent from an initiating Diameter node 101.

The information update module 1022 is adapted to update buffered device capability information of the initiating Diameter node 101 according to device capability information carried in the device capability exchange request received by the receiving module 1021, when the device capability exchange is performed after a Diameter connection is established.

The answer sending module 1023 is adapted to return a device capability exchange answer to the initiating Diameter node 101 according to a state of a state machine of the receiving Diameter node 102 or a request type in the device capability exchange request received by the receiving module 1021.

The answer sending module 1023 may be a status code sending module.

The status code sending module is adapted to return a device capability exchange answer carrying a status code to the initiating Diameter node 101, when the state of the state machine of the receiving Diameter node 102 indicates a connection established state or the request type in the device capability exchange request indicates a device capability exchange after the connection is established, in which the status code indicates a result of the device capability exchange request of the initiating Diameter node 101 processed by the receiving Diameter node 102.

The answer sending module 1023 may also be a capability sending module.

The capability sending module is adapted to return a device capability exchange answer carrying a status code and device capability information of the receiving Diameter node to the initiating Diameter node 101, when the state of the state machine of the receiving Diameter node 102 indicates an initial connection establishment state or the request type in the device capability exchange request indicates an initially-connected device capability exchange, in which the status code indicates a result of the device capability exchange request of the initiating Diameter node processed by the receiving Diameter node.

The modules may be distributed in one device, or distributed in a plurality of devices. The modules may be combined into one module, or further divided into a plurality of sub-modules.

In the receiving Diameter node 102, after the receiving module 1021 receives the device capability exchange request sent from the initiating Diameter node 101, the answer sending module 1022 returns the device capability exchange answer to the initiating Diameter node 101 according to the state of the state machine of the receiving Diameter node 102 or the request type in the device capability exchange request received by the receiving module 1021. Thus, the existing method for updating and negotiating device capability information when a Diameter device is upgraded is optimized, the validity and correctness of route data negotiation during the on-line upgrading process are ensured, the amount of data exchanged over the network is reduced, the repetition and redundancy of database update performed by the Diameter nodes are reduced, the robustness of network connection and system processing is improved, and the stability is enhanced.

Through the above description of the implementation, it is clear to persons skilled in the art that the present invention may be accomplished through hardware, or through software plus a necessary universal hardware platform. Based on this, the technical solutions of the present invention may be embodied in the form of a software product. The software product may be stored in a nonvolatile storage medium (for example, CD-ROM, USB flash drive, or removable hard disk) and contain several instructions adapted to instruct computer equipment (for example, a personal computer, a server, or network equipment) to perform the method according to the embodiments of the present invention.

It should be understood by persons skilled in the art that the accompanying drawings are merely schematic views of preferred embodiments, and modules or processes in the accompanying drawings are not necessarily required in implementing the present invention.

It should be understood by persons skilled in the art that, modules in a device according to an embodiment may be distributed in the device of the embodiment according to the description of the embodiment, or be correspondingly changed to be disposed in one or more devices different from this embodiment. The modules of the above embodiment may be combined into one module, or further divided into a plurality of sub-modules.

The sequence numbers of the above embodiments of the present invention are merely for the convenience of description, and do not imply the preference among the embodiments.

The above descriptions are merely preferred embodiments of the present invention, but not intended to limit the present invention. Any modification, equivalent replacement, and improvement made without departing from the spirit and principle of the present invention shall fall within the scope of the present invention.

What is claimed is:

1. A method for device capabilities exchange, comprising:
   receiving, by a receiving Diameter node, a device capability exchange request sent from an initiating Diameter node; and
   returning, by the receiving Diameter node, a device capability exchange answer to the initiating Diameter node according to a state of a state machine of a receiving Diameter node, wherein the device capability exchange answer carries a status code without device capability information of the receiving Diameter node when the state of the state machine of the receiving Diameter node indicates a connection established state with the initiating Diameter node, and wherein the status code indicates a result of the device capability exchange request of the initiating Diameter node processed by the receiving Diameter node.

2. The method for device capabilities exchange according to claim 1, wherein the device capability exchange request carries device capability information, and before the returning the device capability exchange answer to the initiating Diameter node according to the state of the state machine of the receiving Diameter node or the request type in the device capability exchange request, the method further comprises:
   buffering all or a portion of the device capability information of the initiating Diameter node carried in the device capability exchange request, when the device capability exchange is performed when a Diameter connection is initially established; or
   updating the buffered device capability information of the initiating Diameter node according to the device capability information carried in the device capability exchange request, when the device capability exchange is performed after the Diameter connection is established.

3. The method for device capabilities exchange according to claim 1, wherein the returning the device capability exchange answer to the initiating Diameter node according to the state of the state machine of the receiving Diameter node further comprises:
   returning, by the receiving Diameter node, the device capability exchange answer carrying a status code and device capability information of the receiving Diameter node to the initiating Diameter node, when the state of the state machine of the receiving Diameter node indicates an initial connection establishment state, wherein the status code indicates a result of the device capability exchange request of the initiating Diameter node processed by the receiving Diameter node.

4. The method for device capabilities exchange according to claim 1, wherein after the returning the device capability exchange answer to the initiating Diameter node, the method further comprises:
   updating, by the initiating Diameter node, a device capability information database of the initiating Diameter node according to the state of the state machine of the initiating Diameter node, the request type carried in the device capability exchange answer, or the status code carried in the device capability exchange answer.

5. The method for device capabilities exchange according to claim 4, wherein the updating, by the initiating Diameter node, the device capability information database of the initiating Diameter node according to the state of the state machine of the initiating Diameter node, the request type carried in the device capability exchange answer, or the status code carried in the device capability exchange answer further comprises:

connecting, by the initiating Diameter node, a session by using negotiated device capability information, when the state of the state machine of the initiating Diameter node indicates a connection established state or the request type carried in the device capability exchange answer indicates a device capability exchange after the connection is established; or updating, by the initiating Diameter node, the device capability information database of the initiating Diameter node according to the device capability information of the receiving Diameter node carried in the device capability exchange answer, when the state of the state machine of the initiating Diameter node indicates an initial connection establishment state or the request type carried in the device capability exchange answer indicates an initially-connected device capability exchange.

6. The method for device capabilities exchange according to claim 4, wherein the updating, by the initiating Diameter node, the device capability information of the receiving Diameter node according to the status code carried in the device capability exchange answer further comprises:

connecting, by the initiating Diameter node, a session by using negotiated device capability information, when the status code carried in the device capability exchange answer indicates that device capabilities of the receiving Diameter node are not changed.

7. The method for device capabilities exchange according to claim 1, wherein the initiating Diameter node is a Diameter redirector and the receiving Diameter node is a Diameter relay.

8. A receiving Diameter node, comprising:
a memory, adapted to store instructions; and
a processor, adapted to execute the instructions to:
receive a device capability exchange request sent from an initiating Diameter node, wherein the device capability exchange request carries device capability information of the initiating Diameter node; and
return a device capability exchange answer to the initiating Diameter node according to a state of a state machine of the receiving Diameter node, wherein the device capability exchange answer carries a status code without device capability information of the receiving Diameter node when the state of the state machine of the receiving Diameter node indicates a connection established state with the initiating Diameter node, and wherein the status code indicates a result of the device capability exchange request of the initiating Diameter node processed by the receiving Diameter node.

9. The initiating Diameter node receiving Diameter node according to claim 8, wherein the processor is adapted to execute the instructions further to:
buffer all or a portion of the device capability information of the initiating Diameter node carried in the device capability exchange request, when a Diameter connection is initially established; and
update the buffered device capability information of the initiating Diameter node according to the device capability information carried in the device capability exchange request received by the receiving unit, after the Diameter connection is established.

10. A method for device capabilities exchange, comprising:
receiving, by a receiving Diameter node, a device capability exchange request sent from an initiating Diameter node; and
returning, by the receiving Diameter node, a device capability exchange answer to the initiating Diameter node according to a request type in the device capability exchange request, wherein the device capability exchange answer carries a status code without device capability information of the receiving Diameter node when the request type in the device capability exchange request indicates a device capability exchange after a connection with the initiating Diameter node is established, and wherein the status code indicates a result of the device capability exchange request of the initiating Diameter node processed by the receiving Diameter node.

11. The method for device capabilities exchange according to claim 10, wherein the returning the device capability exchange answer to the initiating Diameter node according to the request type in the device capability exchange request further comprises:
returning, by the receiving Diameter node, the device capability exchange answer carrying a status code and device capability information of the receiving Diameter node to the initiating Diameter node, when the request type in the device capability exchange request indicates an initially-connected device capability exchange, wherein the status code indicates a result of the device capability exchange request of the initiating Diameter node processed by the receiving Diameter node.

12. The method for device capabilities exchange according to claim 10, wherein the device capability exchange answer further carries a request type.

13. The method for device capabilities exchange according to claim 10, wherein after the returning the device capability exchange answer to the initiating Diameter node, the method further comprises:
updating, by the initiating Diameter node, a device capability information database of the initiating Diameter node according to the state of the state machine of the initiating Diameter node, the request type carried in the device capability exchange answer, or the status code carried in the device capability exchange answer.

14. A non-transitory computer readable medium which stores instructions adapted to instruct a computer equipment at a receiving Diameter node to:
receive a device capability exchange request sent from an initiating Diameter node, wherein the device capability exchange request carries device capability information; and
return a device capability exchange answer to the initiating Diameter node according to a request type in the received device capability exchange request, wherein the device capability exchange answer carries a status code without device capability information of the receiving Diameter node when the request type in the device capability exchange request indicates a device capability exchange after the connection is established with the initiating Diameter node, and wherein the status code indicates a result of the device capability exchange request of the initiating Diameter node processed by the receiving Diameter node.

15. The non-transitory computer readable medium according to claim 14, further storing instructions adapted to instruct the computer equipment at the receiving Diameter node to:

buffer all or a portion of the device capability information of the initiating Diameter node carried in the device capability exchange request, when a Diameter connection is initially established; and update the buffered device capability information of the initiating Diameter node according to the device capability information carried in the received device capability exchange request, after the Diameter connection is established.

16. A non-transitory computer readable medium which stores instructions adapted to instruct a computer equipment at a receiving Diameter node to:

receive a device capability exchange request sent from an initiating Diameter node, wherein the device capability exchange request carries device capability information; and return a device capability exchange answer to the initiating Diameter node according to a state of a state machine of the receiving Diameter node, wherein the device capability exchange answer carries a status code without device capability information of the receiving Diameter node when the state of the state machine of the receiving Diameter node indicates a connection established state with the initiating Diameter node, and wherein the status code indicates a result of the device capability exchange request of the initiating Diameter node processed by the receiving Diameter node.

17. The non-transitory computer readable medium according to claim 16, further storing instructions adapted to instruct the computer equipment at the receiving Diameter node to:

buffer all or a portion of the device capability information of the initiating Diameter node carried in the device capability exchange request, when a Diameter connection is initially established; and update the buffered device capability information of the initiating Diameter node according to the device capability information carried in the received device capability exchange request, after the Diameter connection is established.

18. A receiving Diameter node, comprising:

a memory, adapted to store instructions; and a processor, adapted to execute the instructions to:

receive a device capability exchange request sent from an initiating Diameter node, wherein the device capability exchange request carries device capability information of the initiating Diameter node; and return a device capability exchange answer to the initiating Diameter node according to a request type in the device capability exchange request received by the receiving unit, wherein the device capability exchange answer carries a status code without device capability information of the receiving Diameter node when the request type in the device capability exchange request indicates a device capability exchange after the connection is established with the initiating Diameter node, and wherein the status code indicates a result of the device capability exchange request of the initiating Diameter node processed by the receiving Diameter node.

* * * * *

UNITED STATES PATENT AND TRADEMARK OFFICE
CERTIFICATE OF CORRECTION

PATENT NO.        : 8,402,132 B2                                    Page 1 of 1
APPLICATION NO.   : 12/945991
DATED             : March 19, 2013
INVENTOR(S)       : Kang et al.

It is certified that error appears in the above-identified patent and that said Letters Patent is hereby corrected as shown below:

In the Claims

Column 17, Line 54, in Claim 9, delete "initiating Diameter node".

Signed and Sealed this
Twenty-second Day of July, 2014

Michelle K. Lee
*Deputy Director of the United States Patent and Trademark Office*